US008781616B2

(12) United States Patent
Bourgeois et al.

(10) Patent No.: US 8,781,616 B2
(45) Date of Patent: Jul. 15, 2014

(54) ROBOTIC UNSCRAMBLER AND METHOD

(75) Inventors: Marc Richard Bourgeois, Liberty, OH (US); Roger Phillip Williams, Cincinnati, OH (US); Jeffrey Kyle Werner, Liberty, OH (US); Kunie Kolb, Miami Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 91 days.

(21) Appl. No.: 13/491,735

(22) Filed: Jun. 8, 2012

(65) Prior Publication Data
US 2012/0330457 A1    Dec. 27, 2012

Related U.S. Application Data
(60) Provisional application No. 61/501,366, filed on Jun. 27, 2011.

(51) Int. Cl.
| *G06F 7/00* | (2006.01) |
| *B65G 47/248* | (2006.01) |
| *B65B 35/58* | (2006.01) |

(52) U.S. Cl.
CPC ............ *B65G 47/248* (2013.01); *B65B 35/58* (2013.01); *B65G 2201/0244* (2013.01)
USPC .......... 700/213; 700/214; 700/217; 700/220; 700/228; 700/245

(58) Field of Classification Search
None
See application file for complete search history.

(56) References Cited

U.S. PATENT DOCUMENTS

| 2,642,212 A | 6/1953 | Currivan |
| 3,670,863 A | 6/1972 | Meier et al. |
| 3,964,233 A | 6/1976 | Thomas |
| 4,610,126 A | 9/1986 | DeSantis |
| 4,678,073 A | 7/1987 | Anderson et al. |
| 4,819,784 A | 4/1989 | Sticht |
| 4,876,728 A | 10/1989 | Roth |
| 4,909,376 A | 3/1990 | Herndon et al. |
| 4,976,344 A | 12/1990 | Hultberg |
| 5,040,056 A | 8/1991 | Sager et al. |
| 5,041,907 A | 8/1991 | Sager et al. |
| 5,097,942 A | 3/1992 | Codde |

(Continued)

FOREIGN PATENT DOCUMENTS

| EP | 0526403 B1 | 2/1993 |
| EP | 0706838 B1 | 4/1996 |

(Continued)

OTHER PUBLICATIONS
International search report date Sep. 3, 2012, 8 pages.

*Primary Examiner* — Yolanda Cumbess
(74) *Attorney, Agent, or Firm* — Jeffrey V Bamber; Kim W Zerby

(57) ABSTRACT

A robotic unscrambler apparatus is provided that ensures articles that are delivered in an initial orientation are transported in a conveyable orientation for further treatment at one or more stations in a production line. The apparatus includes a conveyance apparatus and at least one picker. An uprighting device is provided with a series of guides. The picker removes articles from the conveyance apparatus, and places the articles onto one of the guides. The uprighting device moves the guides between article placement positions and article conveyance positions. Each guide may include a contoured article support surface that facilitates centering of an article placed thereon.

24 Claims, 8 Drawing Sheets

(56) References Cited

U.S. PATENT DOCUMENTS

| | | |
|---|---|---|
| 5,186,599 A | 2/1993 | Fluck |
| 5,261,521 A | 11/1993 | Malow et al. |
| 5,285,884 A | 2/1994 | Polling et al. |
| 5,314,055 A | 5/1994 | Gordon |
| 5,339,607 A | 8/1994 | Regier |
| 5,568,593 A | 10/1996 | Demarest et al. |
| 5,687,831 A | 11/1997 | Carlisle |
| 6,115,990 A | 9/2000 | Vogelsanger |
| 6,122,895 A | 9/2000 | Schubert |
| 6,212,968 B1 | 4/2001 | Hiruma et al. |
| 6,293,387 B1 | 9/2001 | Forster |
| 6,360,142 B1 | 3/2002 | Miura et al. |
| 6,374,997 B1 | 4/2002 | Spadafora et al. |
| 6,701,694 B2 * | 3/2004 | Huppi et al. ............... 53/443 |
| 6,826,444 B2 | 11/2004 | Herzog |
| 6,885,393 B2 | 4/2005 | Herre |
| 6,901,726 B2 * | 6/2005 | Huppi et al. ............... 53/473 |
| 7,036,658 B2 | 5/2006 | Hartness et al. |
| 7,055,676 B2 | 6/2006 | Hartness et al. |
| 7,055,677 B2 | 6/2006 | Hartness et al. |
| 7,207,434 B2 | 4/2007 | Hartness et al. |
| 7,240,465 B2 | 7/2007 | Davi' et al. |
| 7,261,199 B2 | 8/2007 | Hartness et al. |
| 7,654,380 B2 | 2/2010 | Nishihara et al. |
| 7,775,373 B2 | 8/2010 | Grundtvig et al. |
| 2006/0231372 A1 | 10/2006 | Von Freden |
| 2012/0205928 A1 | 8/2012 | La Rouvere et al. |

FOREIGN PATENT DOCUMENTS

| | | |
|---|---|---|
| EP | 0749902 A1 | 12/1996 |
| EP | 0856465 B1 | 9/2001 |
| EP | 1076020 B1 | 12/2003 |

\* cited by examiner

ROBOTIC UNSCRAMBLER AND METHOD

CROSS REFERENCE TO RELATED APPLICATIONS

This application claims the benefit of the filing date of U.S. Provisional Patent Application Ser. No. 61/501,366, filed Jun. 27, 2011.

FIELD OF THE INVENTION

The present disclosure is directed to a robotic unscrambler and method that rearranges and transports articles, products, containers, canisters, devices and other objects along a production line. In particular, the present disclosure is directed to a robotic unscrambler and method that takes incoming articles and places the articles in the desired conveyable orientation in a production line.

BACKGROUND OF THE INVENTION

In commercial manufacturing installations, varieties of robotic unscramblers are used for the transport of objects (including but not limited to one or more empty containers or canisters, and one or more articles and devices for assembly, referred to herein generally as an "article" or collectively as "articles"). An initial receptacle (such as a hopper) delivers such articles along a conveyance apparatus (such as a conveyor belt) upon which the articles are scrambled in various random orientations. The articles pass by robotic picking devices ("pickers") that are disposed in fixed positions. The pickers are entrusted with the task of unscrambling such articles from an initial article picking position and re-orienting the articles into an article transfer position in which each article is properly positioned for further transport within a production facility. The pickers are selected from one or more commercially available robot pickers.

Pickers that arrange articles from an initial article picking position to an article transfer position typically include a robotic arm of which a moveable end-effector thereof is connected to a gripper. A programmable controller moves the robotic arm and gripper to the article, picks up the article by controlling the gripper, moves the robotic arm so as to move the picked article from an article transfer position and releases the article by controlling the gripper (for instance, to place the article upright within a puck for further treatment; to place the article into a conveyable orientation for conveyance on a running belt, a vacuum-conveyer, a neck-conveyer or other conveyance device; or to alternatively place the article into a receptacle with like articles to effect grouping of like articles prior to further processing, for instance, to place like articles on a pallet for placement of identifying article bar codes on the articles and/or the pallet). Once the gripper has picked up the targeted articles, the gripper moves the articles into at least one article transfer position for eventual release.

Assuming articles of similar size and geometry, a robotic arm with a camera can detect current article picking positions, pick up the articles and then place them in a stable conveyable orientation for conveyance and further processing. This approach can be costly if a high throughput is necessary since a robot can typically orient only one part at a time and only with respect to similarly configured articles. When the article changes, and thereby the article configuration changes, there is downtime on the production line to accommodate changeover of parts that accommodate transport of differently configured articles. In addition, a change in article geometry, contour, material composition, or means of manufacture often requires the robotic arms to make repeated gripping attempts to transpose the article from its initial article picking position to a subsequent stable orientation appropriate for conveyance and further processing. Thus, articles having the same design may have been manufactured by different methods (including but not limited to injection molding, blow molding, extrusion and other fabrication methods) which requires customization of the production line to include picker configurations amenable to variances in the articles' composition and appearance.

Thus, the search for improved unscramblers has continued. A robotic unscrambler that accommodates transposition of a variety of article sizes, geometries, contours, textures, designs, material compositions, and means of manufacture and aesthetic features would therefore provide advantages in production lines. Such an unscrambler should ensure stable, conveyable orientation of articles having any article configuration, regardless of the article's symmetry (or lack thereof) and regardless of the number of articles disposed in a random orientation during any runtime. The conveyable orientation is ideally retained so that properly oriented articles are readily transported for further processing without delay and the transport mechanism for such articles continuously receives new articles for conveyance without interruption.

SUMMARY OF THE INVENTION

According to an aspect of the disclosed robotic unscrambler, the robotic unscrambler rearranges a plurality of articles into a stable conveyable orientation. The robotic unscrambler includes a conveyance apparatus such as a conveyor belt traveling in a first direction of travel. The conveyance apparatus transports the articles within an operating region of at least one picker. A series of guides can be pivotably disposed along a second conveyance apparatus (such as one or more transporters) which may travel in the first direction of travel, or in a second direction of travel. The second direction of travel may be in any suitable orientation including, but not limited to, in a direction opposite to, or in a direction orthogonal to, the first direction of travel. Each guide includes a guide support surface along which each guide is supported during transport through the operating region. Each guide further includes an opposed article support surface on which the picker places an article when the guide is in an initial article placement position. The guide can be joined to the transporter at a pivotable connection. The article support surface of the guide may have a surface contour that is able to accommodate a wide variety of different articles with varying configurations.

In operation, each guide is moved from the initial article placement position (in which each article support surface receives placement of an article thereon), to a subsequent article conveyance position (wherein, in certain embodiments in which there are opposing guides, each guide is pivoted so that each article support surface approaches an opposed article support surface to form an article retention region thereby). In other embodiments, there may be a single set of guides that are pivoted toward a different type of opposing article supporting mechanism or element, such as a rail or a belt. The term "article supporting mechanism" as used herein includes, but is not limited to, opposing guide(s), as well as rails and belts. The second conveyance apparatus facilitates return of each guide toward its initial article placement position so that the guides can return to an article picking region for receipt of more articles. The guides' article conveyance position ensures that each article will remain in its stable, conveyable orientation for concurrent or further treatment at one or more treatment stations in the production line.

A method of rearranging a plurality of articles into a stable conveyable orientation is also disclosed. The method comprises the steps of:

a) providing a conveyance apparatus and at least one picker, the conveyance apparatus traveling in a first direction of travel such that the conveyance apparatus transports the articles within an operating region of the at least one picker;

b) providing an uprighting device comprising a plurality of guides for uprighting the articles;

c) removing the articles from the conveyance apparatus using the at least one picker and placing the articles onto one of the guides of the uprighting device; and d) uprighting the articles on the guides in the uprighting device.

Various other aspects, advantages and features will become readily apparent from the ensuing detailed description, and the novel features will be particularly pointed out in the appended claims.

BRIEF DESCRIPTION OF THE DRAWINGS

The various embodiments of the present disclosure will now be described in detail, which are to be taken together with the accompanying drawings, in which.

DESCRIPTION OF THE INVENTION

Figure 1:
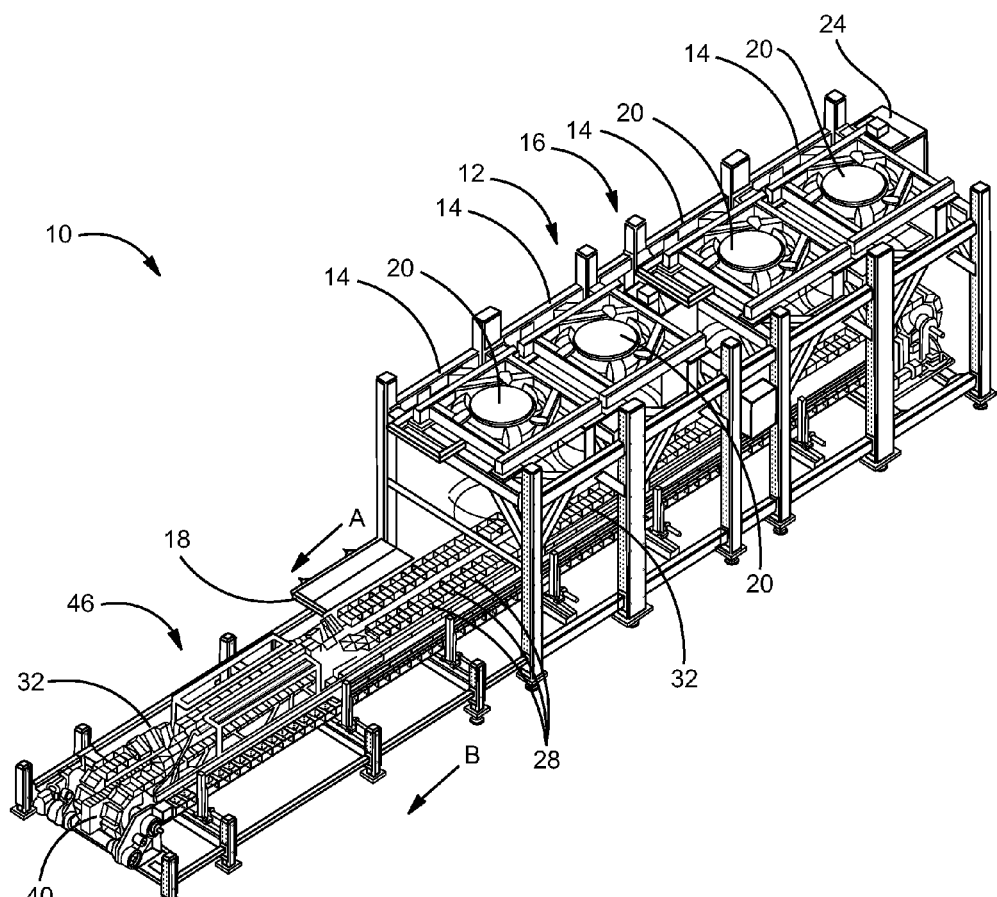
FIG. 1 is a top perspective view of an exemplary robotic unscrambler.
Figure 2:
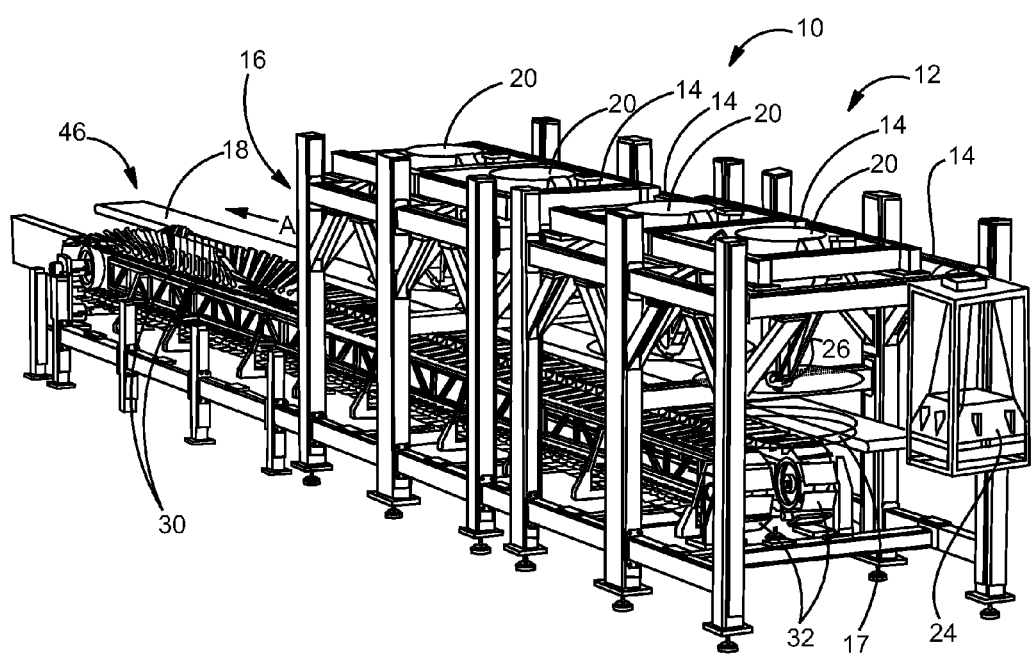
FIG. 2 is a back perspective view of an exemplary robotic unscrambler.

Now referring to the figures, wherein like numerals identify like elements, FIGS. 1 and 2 show one non-limiting embodiment of a robotic unscrambler 10. The unscrambler 10 comprises a frame 12, one or more picking regions 16, a first conveyance apparatus (such as a conveyor belt) 18, and one or more robotic pickers 20. The conveyor belt 18 passes through the picking region 16 in a direction of travel indicated by arrow A. In this embodiment, the conveyor belt 18 transports numerous articles in a scrambled random orientation such that the articles pass in an operating region 17 of one or more robotic pickers 20. In other embodiments, the articles need not be in a random orientation. For instance, the articles can be at partially arranged in an ordered fashion in trays. The term "unscramble", as used herein, is intended to encompass placing articles arranged either randomly or in some ordered fashion into a stable, conveyable orientation.

The frame 12 can comprise a single frame, or a modular frame comprising one or more frame segments 14 that together define one or more picking regions 16. Any number of frame segments 14 may be utilized in series to provide picking regions 16 of sufficient parameters to accommodate orientation of numerous articles received from a receptacle (not shown). Each frame segment 14 supports one or more pickers 20. The modular characteristic of modular frame 12 permits customization of robotic unscrambler 10 within a variety of production installations and further permits customization within a single installation in view of the volumes and types of articles to be processed within that installation.

The receptacle that the articles are received from may be one or more hoppers, although it is understood that a hopper is not the only type of receptacle conducive to use with the robotic unscrambler. The robotic unscrambler can be used with a variety of receptacles, including but not limited to trays, cases, pallets, crates and other article storage and delivery means as is known for use in production lines.

The first conveyance apparatus (such as a conveyor belt) 18 can be any suitable type of conveyance apparatus known in the art. Suitable apparatuses include, but are not limited to conveyor belts, and any of the types of apparatuses described below as being suitable for use as the second conveyance apparatus. The surface of the conveyance apparatus 18 can be smooth; or alternatively, it may be contoured, or textured to assist in retaining the articles thereon.

The pickers 20 are shown as commercially available Delta robots (such as those available from ABB, Inc. of Cary, N.C., USA), although it is contemplated that equivalent and complementary robotic picking devices can be employed with robotic unscrambler 10. Suitable types of pickers 20 include, but are not limited to: parallel kinematics robots, spider or Delta robots, six-axis robots, SCARA robots, and independently actuatable automatic arms. The selection of one or more pickers 20 is not limited to robotic configurations, and alternative picker configurations are amenable for use with the unscrambler. In addition, more than one type of robotic configuration may be used with the robotic unscrambler in a production line.

The pickers 20 are mounted above the conveyor belt 18, and are in communication with a vision system 24 that may comprise one or more cameras that collect and disseminate information to the pickers regarding the articles' location, geometry and orientation. As a result, prior to the beginning of each new working region of the next picker, the initial article picking positions of articles still present on conveyor belt 18 are known. Therefore, idle or non-productive movements of the pickers can be avoided. Idle or non-productive picking operations on a respective article, which would result in incomplete picking of articles and subsequent mechanical processing to make up for such deficiencies, can also be avoided.

Each picker 20 includes control and drive means for movement of a robotic arm 26 of at least one picker for transposing the individual articles from conveyor belt 18 onto an individual guide 28. The robotic arm 26 can have a gripper disposed at a free extent thereof that includes a pick-up mechanism for picking and placing an article. A programmable controller may control the receptacle (such as the hopper) and the conveyors and the pickers to: move the robotic arm 26 to an article which is in a random orientation; pick up the article by controlling the gripper; move the robotic arm to orient the picked article in at least one article placement position; and, release the article by controlling the gripper (for instance, to place the article on a guide 28, as further described below). The gripper may be one of many different kinds of tools known to those skilled in the art such as, for example, a magnetic device, a vacuum or suction device, a mechanical device or any other known device, depending on the characteristics of the article to be picked and placed. One suitable gripper is described in U.S. patent application Ser. No. 13/025,185, filed Feb. 11, 2011. If the gripper includes a vacuum or suction device, the robotic arm 26 is moved to a defined position in the horizontal plane under the control of the programmable controller and lowered onto an article that is disposed at that location. The gripper then engages and lifts that individual article. The gripper may lower the picked article onto the appropriate guide 28, thereby providing the desired correct orientation of the article in relation to the guide 28.

The unscrambler 10 may improve the throughput of articles through the same by handling the articles in a two-step manner. In a first step, the articles are picked from the conveyor belt 18 and placed onto the surface of one of the guides 28. In the second step, the second conveyance apparatus transports the articles and guides 28, and the guides 28 upright the articles. This is believed to provide more efficient use of the pickers 20 than requiring that the pickers to perform all three functions of picking the articles, orienting the articles, and uprighting the articles.

Providing a vision system, and/or a counter for the individual articles on conveyor belt 18, upstream of the beginning of the picking region 16, makes it possible to release an empty article from the receptacle and allow it to pass into picking region 16, whenever the number of individual articles is detected as having reached a predetermined number for fulfillment of an established manufacturing quota during a preset runtime. The counter may utilize at least one camera 24 operatively associated with pickers 20 that records each position at which there is an individual article on conveyor belt 18 (along with the rotational position of the article) as the articles pass within the camera's field of view. The recorded information is stored in the programmable controller and subjected to further processing and computation relative to the travel speed of conveyor belt 18.

The second conveyance apparatus may be described as being "adjacent" to the first conveyance apparatus, conveyor belt 18. The term "adjacent", as used herein, does not require that the two conveyance apparatuses be touching, or that there be nothing between the first conveyance apparatus and the second conveyance apparatus. The apparatuses need only be close enough that the pickers can pick articles off the first conveyance apparatus 18 and place them onto the guides 28 on the second conveyance apparatus.

Figure 3:
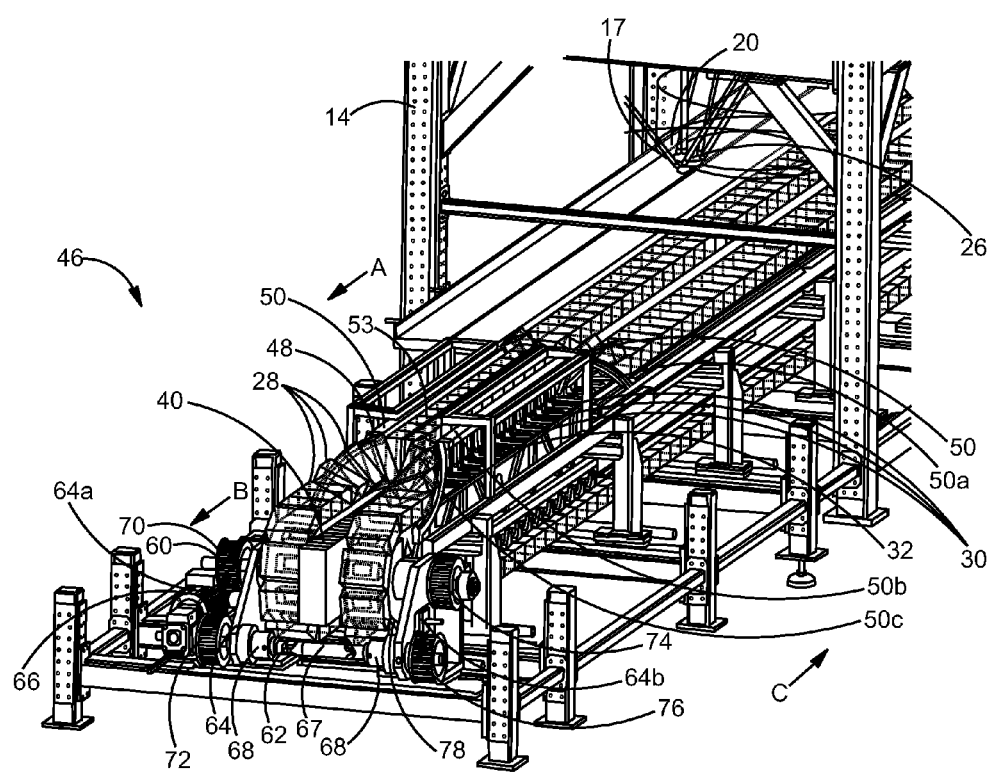
FIG. 3 is a front perspective view of an orientation device operating in an orientation region of the robotic unscrambler of FIGS. 1 and 2.
Figure 4:
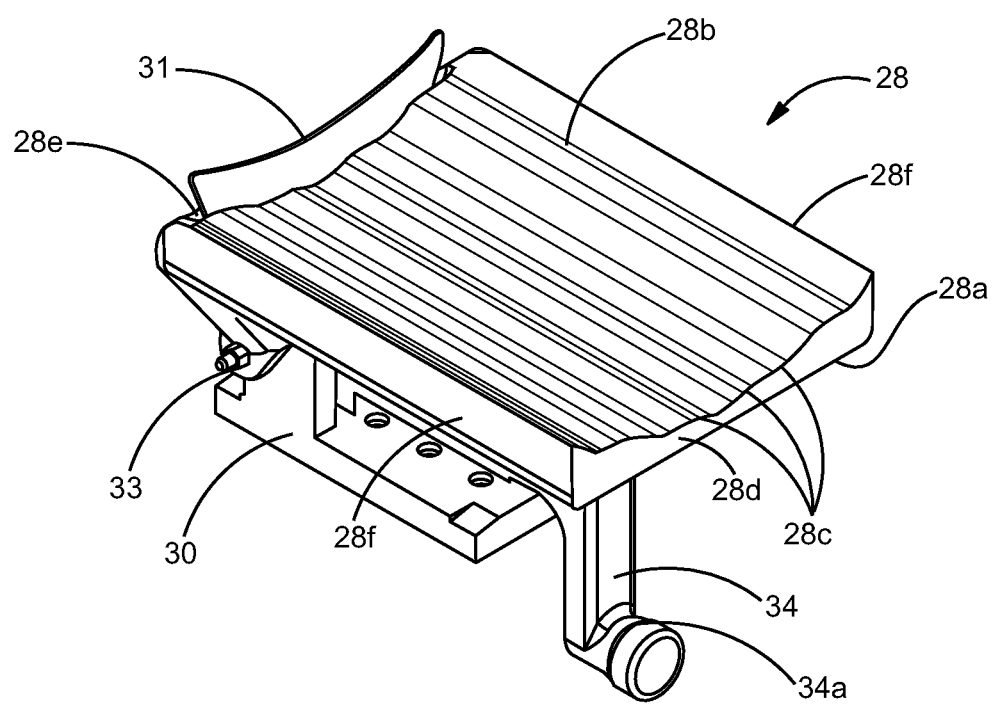
FIG. 4 is a top perspective view of an individual guide employed by the robotic unscrambler of FIGS. 1 and 2.
Figure 5:
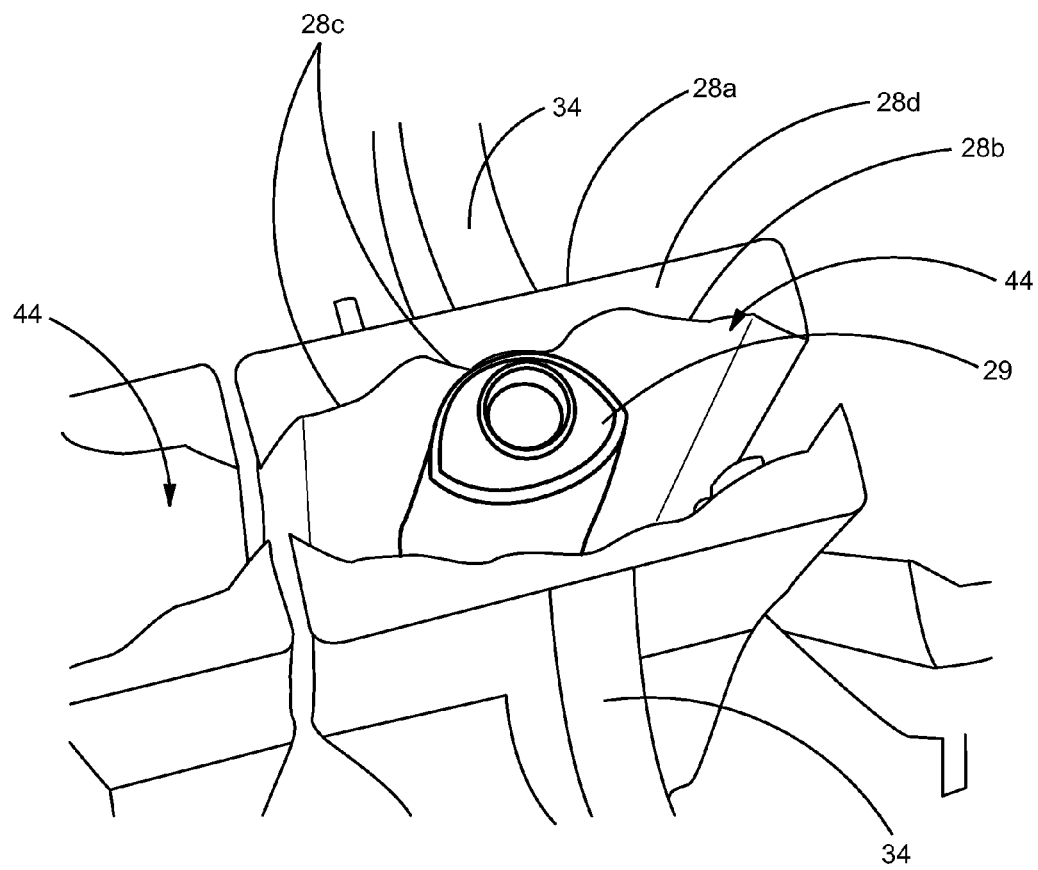
FIG. 5 is a top view of a pair of guides as shown in FIG. 4 retaining an exemplary article.

One non-limiting embodiment of the second conveyance apparatus and the guides 28 will now be described in greater detail. Referring further to FIGS. 3, 4 and 5, a series of transporters 30 is disposed along a corresponding movable transporter belt 32 so as to transport opposing pairs of guides 28 thereby. The guides 28 may be in any suitable form, including in the form of clam shell-like nests. Each guide 28 may extend in the cross-machine direction relative to the transporter belt 32, and be pivotably supportable by a corresponding transporter 30. As shown in FIG. 4, each guide 28 includes a guide support surface 28a, along which each guide 28 is supported during transport through and from picking region 16, and an opposed article support (or "seating") surface 28b, along which a picker 20 disposes an article when the guide is in an initial open article placement position. As shown in FIG. 4, article support surface 28b incorporates a non-article-specific contour that ensures stable support of a wide variety of articles thereby. The article support surface 28b may incorporate a generally radial curvature as shown that centers an article placed thereon and thereby accommodates a variety of article configurations without any further customization of guide 28. The article support surface 28b may have a generally convex configuration. Article support surface 28b may further incorporate one or more surface contours, such as ridges 28c shown in FIG. 4, and/or one or more surface elements (such as a textured element or "indicia") which frictionally engages an article thereby. The surface contours include but are not limited to a plurality of ridges and a combination of splines, wherein the plurality of ridges and the combination of splines may be straight, angular or curved. In certain embodiments, the surface contours may be substantially parallel to each other and substantially perpendicular to the perpendicular to a top extent 28d and a bottom extent 28e of the guide 28. In certain embodiments, the low point of the surface contours is located in about the center region of the article support surface 28b with respect to the sides 28f of the same. Variances in the curvature that define the surface contour of article support surface 28b, impart the guide 28 with advantageous functions that ensure centering of the articles between the guide's open position and throughout angular movement of the guide to a subsequent upright position as further described below. The configuration of the article support surface 28b of the pair of guides 28 that form a given nest may be the same, or different. In at least one aspect, the guide 28 includes a contoured surface with a predefined curvature and at least one predefined indicia is integral with at least said article support surface 28b of said guide 28.

Figure 6:
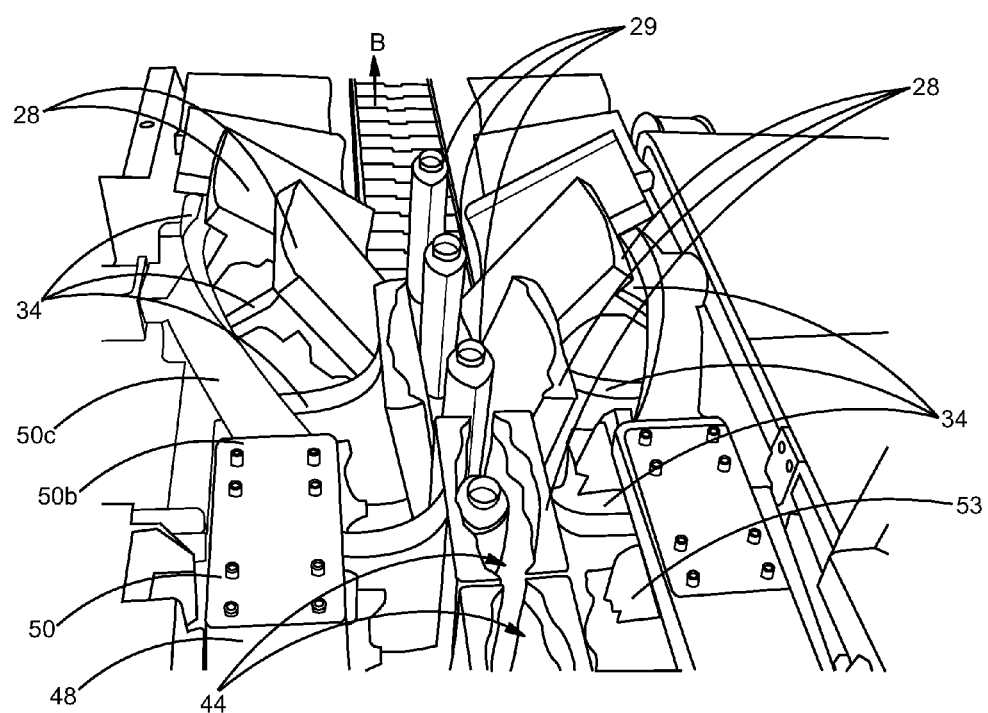
FIG. 6 is a top perspective view of a series of guides and articles transported along an exit portion of an orientation device of FIG. 3.
Figure 7:
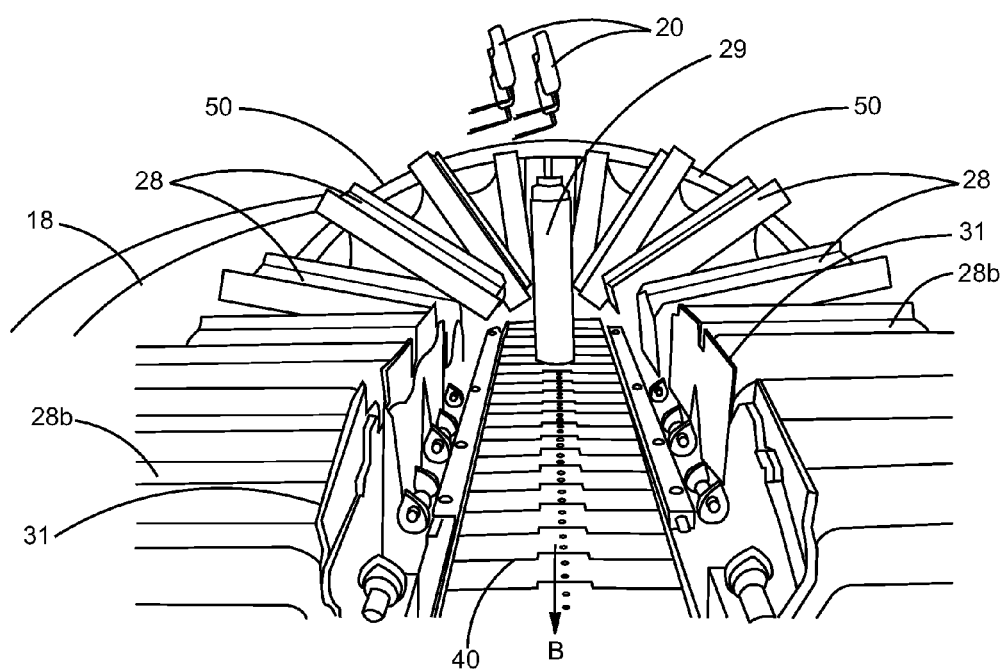
FIG. 7 shows a rear perspective view of the series of guides of FIG. 6 with exemplary articles in a conveyable orientation.

Referring further to FIGS. 4 and 5 and additionally to FIGS. 6 and 7, each guide support surface 28a and article support surface 28b is coextensive with the top extent 28d, adjacent which an upper portion of an article will be disposed, and the bottom extent 28e, adjacent which a bottom portion of an article will be disposed, when a picker 20 picks and places an article on a corresponding article support surface 28b. The article's "top" and "bottom" are relative to article positioning and how an article would appear on a display. However, the "top" and "bottom" of an article may refer to portions of an inverted article or an article subject to angular rotation upon placement in a corresponding guide 28 regardless as to how an article would appear on display. A type of article conducive to placement on guide 28 is shown in FIGS. 5, 6 and 7 as one or more containers 29. Containers 29 are an example of one of many varieties of articles (including, but not limited to products, containers, canisters, devices and other objects) that may be transported and delivered in a conveyable orientation by robotic unscrambler 10.

As shown in FIG. 4, the bottom extent 28e of the guide 28 may include a retractable gate 31 that will be adjacent to the bottom of an article when guide 28 is in an initial open article placement position with an article disposed on article support surface 28b. Each guide support surface 28a may include a coupling element (such as pin, bolt, or other fastener 33) that establishes pivotable communication between each guide 28 and a corresponding transporter 30 such that guide 28 is angularly movable between a generally horizontal position to a generally vertical position, along which angular path any position can define an initial article placement position and a subsequent article conveyance position. During, or after the guide 28 pivots upwardly toward the article conveyance position as shown in FIG. 5, the gate 31 may retract so as to allow unimpeded yet controlled release of an article from the guide 28. The article support surface 28b maintains centering of the article 29 to ensure placement of the article in the conveyable article placement position. As shown in FIG. 7, when the guide 28 returns to its initial placement position, the gate 31 returns to its initial position for ready receipt of additional articles on the guide 28.

Each guide 28 may have an uprighting mechanism 34 (shown in FIGS. 4, 5 and 6) joined thereto. The term "joined to" encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e., one element is essentially part of the other element. The term "joined to" encompasses configurations in which an element is secured to another element at selected locations, as well as configurations in which an element is completely secured to another element across the entire surface of one of the elements. In the embodiment shown, the uprighting mechanism 34 is joined to the guide support surface 28a adjacent its top extent 28d. The uprighting mechanism 34 may include a guidepost 34a (shown in FIG. 4) protruding therefrom for engagement with a corresponding recess, as further described below.

Within the picking region 16, the transporter belt 32 transports the open guides and the articles placed thereon in a direction of travel indicated by arrow B (shown in FIGS. 1 and 3). The transporter belt 32 may be a single conveyance apparatus to which guides 28 are pivotably connected. In the alternative, the transporter belt may comprise a pair of transporter belts along each of which a series of guides 28 is pivotably disposed. Thus, in the latter configuration, the guides 28 in half of the pairs of guides 28 may be arranged on separate transporter belts operating in substantial unison to form the clam shell-like nests around the containers 29. In the latter configuration, the transporter belts may be provided in corresponding movement with an outfeed conveyor 40 disposed therebetween. In the latter configuration, one or more pucks (not shown) may be disposed along outfeed conveyor 40 in correspondence with the articles disposed in the guides. The term "puck", as used herein, refers to a cup-like guide for the base of an article.

Although the direction of travel of transporter belt 32 and outfeed conveyor 40 in the direction of arrow B is shown as the same as the direction of travel of conveyor belt 18 in the direction of arrow A, it is understood that the transporter belt 32 and outfeed conveyor 40 may move in the same, in an opposite direction, an orthogonal direction, or any other suitable direction relative to the direction of travel of the conveyor belt 18. The location of the vision system 24 will be upstream of the picking region 16 relative to the direction of travel of the conveyor belt 18. Therefore, if the conveyor belt 18 moves in the opposite direction to that shown, the vision system 24 will be located at the opposite end of the picking region 16. Alternative conveyance means are contemplated for one or both of transporter belt 32 and outfeed conveyor 40, including but not limited to running belts, chain conveyors, vacuum-conveyers, rails, pucks, pucks disposed on moving belts and other conveyance means, as are known in the art.

The pivotable movement of guides 28 from an initial substantially horizontal, open article placement position toward a subsequent substantially vertical, conveyable article placement position (as shown in FIGS. 5 and 6) aligns article support surfaces 28b between opposing guides 28 so as to create open retention regions 44. The retention regions 44 defined by the guides 28 will retain articles of various sizes, contours, textures, geometries, material compositions and means of manufacture without requiring any changeover of parts. In the embodiment shown, the guides 28 avoid gripping the articles 29, and merely leave a space (retention region 44) for the articles. In other embodiments, the guides 28 could be configured to come together to grip the articles 29.

The unscrambler 10 can handle symmetrical articles, and asymmetrical articles. A symmetrical article is one in which the front and back of the article have the same configuration. Asymmetrical articles have opposing sides with different configurations. The conveyor belt 18 and transporter belt 32 may be controlled at: constant speeds relative to one another; varying speeds; or one or both can be run intermittently. Ideally, the conveyor belt 18 and transporter belt 32 are run such that, upon leaving picking region 16, the retention regions 44 are filled with individual articles in a conveyable orientation for further processing. For symmetrical article geometries, the pickers 20 can place the articles along a single series of guides 28 on one side of outfeed conveyor 40. The articles, whether symmetrical or asymmetrical, are typically placed onto the guides 28 on either of their relatively larger, flatter sides (generally their front or back). In some embodiments, the symmetrical articles are placed substantially consecutively in the series of guides 28 such that every article support surface 28b of guides 28 on one side of outfeed conveyor supports an article thereon. In certain embodiments, pickers 20 place symmetrical articles along the single series of guides 28 on one side of outfeed conveyor 40 and the orientation device moves the guides 28 between an open position and a closed position to form the retention regions 44.

Figure 8:
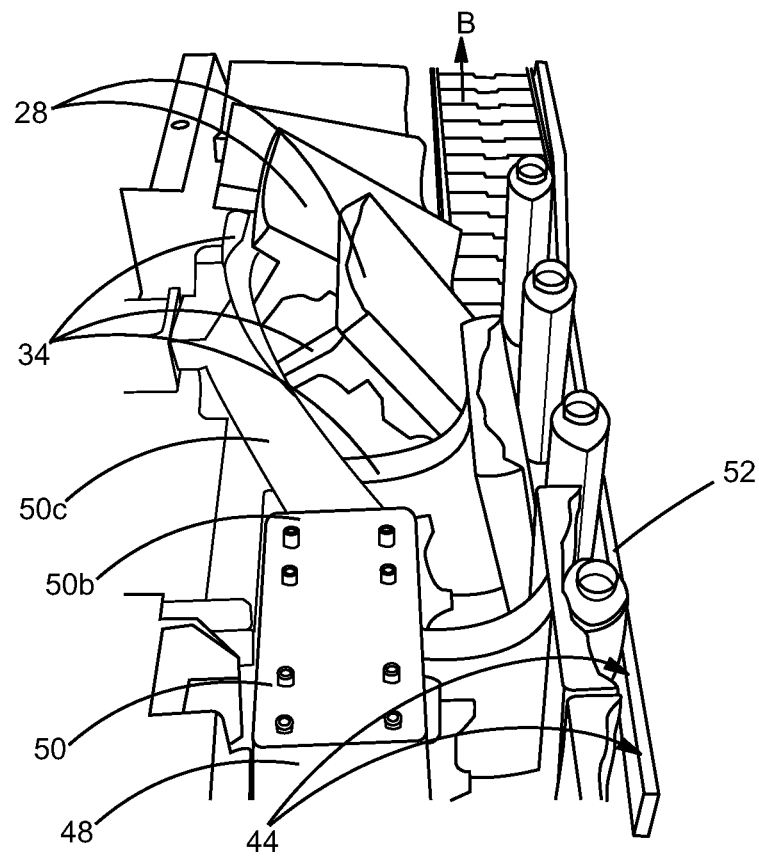
FIG. 8 is a rear perspective view of an alternative embodiment in which a single set of guides are pivoted toward a rail.
Figure 9:
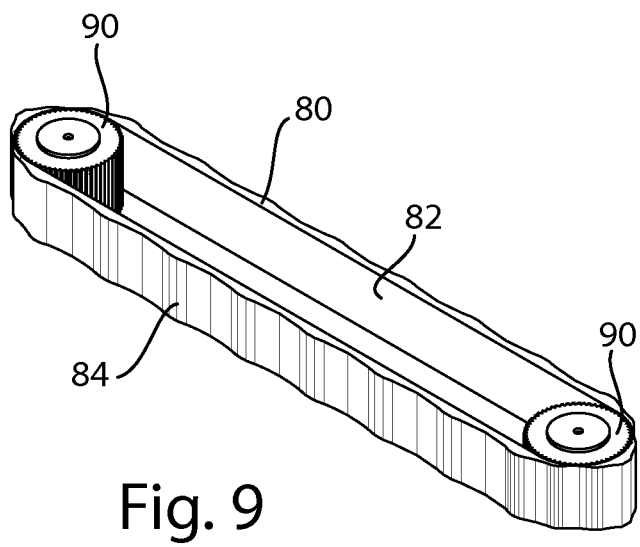
FIG. 9 is a perspective view of a profiled belt that can be used in place of the rail in FIG. 8.

In other embodiments in which the articles are symmetrical, such as shown in FIG. 8, a different mechanism or element could be used on one side of the outfeed conveyor 40 to assist in uprighting the articles. Any suitable mechanism or element can be used. In FIG. 8, a rail 52 is used in conjunction with a single series of guides 28 for uprighting the articles 29. An alternative mechanism is shown in FIG. 9. FIG. 9 shows a belt 80 that can be used in place of the rail in FIG. 8. The belt 80 can have any suitable configuration. The belt 80 is in the form of a closed loop having an inner surface 82 that has ridges and grooves so that it is configured to engage with the grooves and ridges, respectively, on the rolls 90 used to rotate the belt. The outer surface 84 of the belt can have any of the features described herein that are suitable for the article support surfaces 28b of the guides 28. In the embodiment shown, the outer surface 84 of the belt 80 is profiled so that it has a configuration that can be the same as, or similar to, the configuration of the article support surfaces 28b of the guides 28. Such a belt 80 can be made in any suitable manner. In some embodiments, the belt 80 can be provided with ribs, or other such elements that are joined to a flat belt. The elements can provide touch points for control of the articles. The elements can be joined to a flat belt in any suitable manner, including but not limited to by bonding, welding, or bolting the same. In the embodiment shown in FIG. 9 the belt 80 may comprise a contoured belt made from inside to outside surface: a timing belt having a contoured polyurethane form bonded thereto, to which a LYCRA surface is laminated to form the outer surface of the belt.

For asymmetrical article geometries, upon receiving such article geometry information from one or more of cameras 24, the pickers 20 distinguish between an initial "face up", "face down", or other orientation for each article traveling along conveyor belt 18. By "other orientation", it is recognized that the system is not limited to handling articles only in "face up" and "face down" orientations, and providing an output stream of articles with one of these faces in a particular orientation. For example, there can be other orientations such as for a bottle having four sides, where the bottle may be resting on any of these sides on the conveyor belt 18. The present system can provide an output stream of articles with any of its sides in a particular orientation. For simplicity, however, the following description will refer to the "face up" and "face down" orientations, although the terms "first side" and "opposing side" can be substituted for "face up" and "face down" wherever the latter terms are used.

The initial article orientations are determined by a secondary camera and sensor system that performs a subsequent check on articles if their initial "face up", "face down", or other orientations are not readily apparent. In certain embodiments, the pickers 20 thereby transpose asymmetrical articles that are in an initial "face up" orientation into guides 28 along one side of outfeed conveyor 40. In these embodiments, pickers 20 further transpose asymmetrical articles that are in an initial "face down" orientation in opposed alternate guides 28 along another side of outfeed conveyor 40. By "alternate" guides, it is meant that two articles will not be placed on opposing guides, but rather a subsequently picked article will be placed on a guide of a subsequent pair of guides along the other side of outfeed conveyor 40. With such placement, an article is disposed in guides 28 such that each guide transporting an article therewith travels in a pair with an empty guide. As guides 28 pivotably encapsulate the articles so as to form retention regions 44 thereabout (as further described below), all of the articles are positioned in a stable conveyable orientation relative to aligned article support surfaces 28b of a pair of guides, regardless of each article's initial "face up" or "face down" orientation. Of course, the unscrambler 10 can be operated in a similar manner to handle symmetrical articles, but such steps are not necessary.

In other embodiments, asymmetrical articles can be handled in an alternative manner. Instead of having the pickers transpose asymmetrical articles onto guides on opposite sides of the outfeed conveyor depending on whether they are in a "face up" or "face down" orientation, the pickers can transpose the articles onto a single series of guides 28 on one side of outfeed conveyor 40. The articles can be placed onto the guides in both a "face up" and a "face down" orientation. The articles can then subsequently be uprighted, and thereafter turned to the correct orientation by a separate article turning mechanism. Suitable article turning mechanisms include, but are not limited to, linear orienters or bottle turning mechanisms. Such devices are commercially available. The article turning mechanism may be part of the unscrambler, or it may be a separate piece of equipment downstream from the unscrambler.

The guides 28 transport the articles from the picking region 16 to a subsequent orientation region 46 (as shown in FIGS. 1 and 2). The orientation region 46 includes an orientation device 48 that ensures proper stable orientation of the articles retained by retention regions 44. The orientation device 48 shown comprises two mutually disposed guide rails 50 (shown in FIG. 3) that form a travel path for guides 28 and the articles transported thereby. Thus, in some embodiments, the orientation device may form a travel path mechanism that provides a definable travel path to create a channel 53. The orientation device 48 comprise any suitable type of device including, but not limited to: a single guide rail, two mutually opposed guide rails, a plurality of guide rails, at least one airlift mechanism, at least one electromagnetic mechanism, at least one servo mechanism, or other suitable device. Although a pair of guide rails 50 is shown in FIG. 3 defining a single channel 53 and a corresponding channel path, it is understood that the orientation device may include any number of guide rails, and may be implemented to provide a desired number of channel paths in a production line.

In this embodiment, each orientation device 48, such as guide rail 50, includes a generally curved entrance portion 50a (shown in FIG. 3) leading to a channel portion 50b and terminating in a generally curved exit portion 50c (channel portion 50b and exit portion 50c are shown in FIGS. 3 and 6). One or both of entrance portion 50a and exit portion 50c may assume a generally helical configuration. Entrance portions 50a may be curved generally upwardly so as to form an essentially V-shaped angle therebetween and support uprighting mechanisms 34 therealong. As transporter belt 32 conveys the guides 28 along a travel path, the entrance portions 50a engage uprighting mechanisms 34 so as to elevate each guide from an initial open, article placement position—in which each article support surface 28b is in an orientation facing upwardly—to a subsequent article conveyance position—wherein each guide 28 is upwardly pivoted so that each article support surface 28b approaches an opposed article support surface 28b. FIGS. 5 and 6 show article support surfaces 28b generally in parallel alignment with one another, although it is understood that the article support surfaces 28b may be angularly disposed relative to one another to accommodate articles of larger volumes and/or customized designs. As the guides 28 pivot upwardly to form retention regions 44, each article 29 supported by a corresponding guide is elevated into a stable, conveyable orientation for further processing. The conveyable orientation can include synchronization of each article 29 with a corresponding puck transported by outfeed conveyor 40. As shown in FIG. 7, during angular movement of guides 28, the gates 31 thereof retract to permit disposal of articles directly in a conveyable orientation on outfeed conveyor 40 or in corresponding pucks (not shown) distributed along outfeed conveyor 40 and carried thereby. By the term "gate" 31, it is meant to include mechanisms that when opened will allow articles to drop out of the guides 28. Gates 31 include but are not limited retractable gates, slide gates, end-hinged gates, sensor operated gates, and other combinations and equivalents thereof. In other embodiments, the gates 31 can be eliminated. If desired, in such embodiments, the articles can be picked out of the guides 28 by another picker.

The articles (and any corresponding pucks) are transported through a channel 53 defined by channel portions 50b of guide rails 50. Channel portions 50b may be in generally parallel alignment with one another so as to define a channel path therebetween. Channel portions 50b retain guides 28 in a conveyable article conveyance position by retaining engagement with uprighting mechanisms 34 as each transporter belt 32 moves alongside the channel path. Outfeed conveyor 40 moves along the channel path defined by channel 53 and retains stable alignment of the articles in retention regions 44. Thus, robotic unscrambler 10 predictably and reliably ensures that the guides 28 provide all of the articles in the same conveyable orientation for concurrent or subsequent operations at one or more treatment stations along the production line. Such treatment stations include, but are not limited to, stations for labeling, stations for decorating (such as hot-stamping or applying foil), case or tray loading, filling, capping and sealing the articles, which stations can electively treat the properly positioned articles in succession for eventual delivery from the production facility. By "concurrent operations", it is meant that such stations can operate while the articles are in the guides 28.

Exit portions 50c of the travel path mechanism, such as guide rails 50, may be curved generally downwardly so as to support uprighting mechanisms 34 therealong while retaining the proper stable, conveyable orientation of articles as they leave orientation device 48. As transporter belts 32 continue transport of guides 28 along a constant travel path, exit portions 50c engage uprighting mechanisms 34 so as to facilitate pivotable descent of the guides 28 toward the initial article placement position. As each guide 28 angularly descends toward the initial article placement position, outfeed conveyor 40 transports articles 29 in a conveyable article placement position from robotic unscrambler 10 to a subsequent installation for further processing of the articles. Outfeed conveyor 40 retains the articles in their proper conveyable orientation when the articles are independently positioned on the outfeed conveyor itself. The conveyable orientation is also maintained when the articles 29 have been disposed in corresponding pucks that may be individually placed along outfeed conveyor 40 and carried thereby or integral with the outfeed conveyor. Each closed loop transporter belt 32 then carries open guides 28 around in the opposite direction corresponding to the direction of travel indicated by arrow C (as shown in FIG. 3) along the length of orientation region 46 and picking region 16. Each transporter belt 32, thus, delivers guides 28 to an initial open article placement position for ready receipt of empty articles thereby.

In some embodiments, each guide rail 50 may include a travel recess (not shown) defined along at least a portion of at least one guide rail 50. The travel recess engages each guidepost 34a and leads the movement of each guide 28 thereby. In such configuration, as guides 28 approach orientation device 48, guideposts 34a establish releasable engagement with the travel recess to ensure uninterrupted movement of each guide 28, and thereby each article, through channel 53. The guideposts 34a may maintain engagement with the travel recess such that guideposts 34a exit the orientation device and angularly dispose the empty guides 28 along transporter belts 32 for return to picking region 16.

If there are two transporter belts 32, they may run concurrently at equivalent speed to ensure synchronous angular movement of pairs of guides 28 to form retention regions 44. It is contemplated, however, that robotic unscrambler 10 may facilitate asynchronous guide transport such that an article captured on an article support surface 28b remains in alignment therealong throughout an angular path traveled by guide 28. Thus, guides 28 may not necessarily assume a generally upright position relative to one another, particularly if the article comprises a large volume object or an object possessing unique design characteristics. The initial open, article placement position for the guide may be at a predetermined angle of inclination accommodating the special characteristics of the article being conveyed (although the guide 28 itself retains its curvature and/or indicia to ensure centering of any article placed on article support surface 28b thereof). A guide 28 supporting such an article 29 thereon can move at an independent speed by controlling a transporter belt 32 that transports such guide. This speed is independent of a speed assumed by a second transporter belt 32 transporting a corresponding guide 28 in a pair of guides. The guide supporting the article 29 can do so along any portion of the guide's angular path, thereby permitting the guide to readily convey uniquely configured articles (and even inverted articles) in a stable, conveyable orientation. Guide rails 50 can be modified accordingly to provide travel paths of varying widths and paths (including bifurcated and non-linear paths) to accommodate a large variety of article configurations and orientations without affecting the stable, conveyable orientation of the articles 29.

At least one transporter belt 32 and/or outfeed conveyor 40 is driven by a drive shaft assembly 60 as shown in FIG. 3 having an actuatable drive shaft 62 operably supported by a frame 64. A drive shaft actuator such as servo motor 66 imparts rotational motion to drive shaft 62 having linkage 67 disposed intermediate bearing assemblies 68. Drive shaft 62 translates rotational motion to spools 70, 72 rotatably disposed along a drive shaft frame segment 64a so as to facilitate a first transporter belt 32 thereby and further translates rotational motion to spools 74, 76 rotatably disposed along a drive shaft frame segment 64b so as to facilitate a second transporter belt 32 thereby. A pair of generally concentrically positioned outfeed spools 78 (one of which is shown in FIG. 3) rotatably engages a primary drive shaft (not shown) for translation of rotational motion via complementary bearing assemblies. Upon activation of servo motor 66, drive shaft 62 rotates the spools 70, 72 directly and rotates the spools 74, 76 via linkage 67 and a transporter belt 32 (transporter belts 32 are transporting guides 28 in FIG. 3 but can be individually recognized in FIGS. 1 and 2). The primary drive shaft will rotate at this instant. As the drive shafts rotate, spools 78 assume rotational movement, thus imparting translational movement to at least one transporter belt 32 and/or outfeed belt 40. Spools 78 may have a predetermined distance therebetween within which outfeed conveyor 48 may maintain translational motion intermediate transporter belts 32, regardless of whether movement of outfeed conveyor 40 is effected by drive shaft assembly 60 or another independent drive means. Outfeed conveyer 40 may have translational motion conveyed thereto by a second actuator (not shown) such that movement of feed belts 32 and outfeed conveyor 40 is not interdependent. The configuration of drive shaft assembly 60 is provided as an example of various drive means that can be successfully used with the robotic unscrambler.

It is understood that a second conveyor belt (not shown) may be used with the robotic unscrambler for delivery of complementary article sizes, geometries, contours, designs, textures, material compositions, means of manufacture and aesthetic features. In such a configuration, two mutually separate container conveyor belts can run on respective sides of feed belts 32 and outfeed conveyor 40. Likewise, such conveyor belts may move at mutually different speeds so that one conveyor belt delivers a quantity of first articles, while the second conveyor belt runs at a different speed for delivery of a quantity of second articles. Such a configuration may be advantageous for processing of primary articles and secondary articles for regional distribution, wherein the primary articles have a generally region-wide appeal and the secondary articles have a strong appeal in a localized regional segment.

The speed of the articles and guides relative to each other may be controlled so that no article 29 leaves picking region 16 of robotic unscrambler 10 without being picked and placed in an available open guide. In such an embodiment, all guides 28 that are targeted for article placement would carry articles on the article support surfaces 28b thereof. In addition, there are no empty guides 28 that should not be empty. In other embodiments, however, the speed of the articles 29 coming into the unscrambler may be greater than that which allows all of the articles 29 to be picked up. In these embodiments, the unscrambler may be provided with a recirculation system, such as a recirculation conveyor, so that any articles 29 that are not picked can be brought back to the front of the conveyor 18. A programmable controller associated with picker 20 can account for the volume of articles that have been transported and properly oriented so that a receptacle can subsequently deliver other articles. Such subsequently delivered articles may be delivered in groups wherein different article groups have different article characteristics. Robotic unscrambler 10 therefore accommodates all such article groups without requiring any type of article-specific machinery.

The robotic unscrambler may predictably and reliably transpose articles from a scrambled, random orientation to a stable, conveyable orientation and accommodate a variety of article sizes, geometries, contours, textures, designs, material compositions, means of manufacture and aesthetic features. The robotic unscrambler may realize advantageous reductions in temporal and fiscal costs associated with installation, operation and maintenance. However, it should be understood that the unscrambler need not necessarily provide such advantages unless such advantages are specifically included in the appended claims. The costs involved in setting up the installation may be reduced due to the decrease in the number of robots required to achieve similar and higher throughput as compared with current commercial unscramblers. Additionally, the susceptibility to breakdown may also be reduced as the need to change parts in accordance with each change in article type is obviated. This means that the present robotic unscrambler can operate virtually uninterrupted for extensive mean time between failures. A benefit gained by the present robotic scrambler over traditional unscrambler devices is that the article—no matter what its features—remains in a stable, conveyable orientation when being placed onto the outfeed device conveyor. This is a particularly advantageous feature when contemporary plastics are used in commercial article configurations that render the articles lightweight and consequently very difficult to keep stable for all variances in article positioning.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A robotic unscrambler for rearranging a plurality of incoming articles into a stable conveyable orientation, said unscrambler comprising:
   (a) a first conveyance apparatus traveling in a first direction of travel such that said conveyance apparatus transports said incoming articles within an operating region of at least one picker;
   (b) an uprighting device adjacent said first conveyance apparatus, said uprighting device comprising a plurality of guides pivotably disposed along a second conveyance apparatus traveling in a direction of travel, wherein said picker is configured to remove said articles from said first conveyance apparatus and place said articles onto article support surfaces of said guides of said uprighting device, and said guides pivot upward and transversely to the direction of travel of the second conveyance apparatus to upright said articles and place the articles into a stable conveyable orientation.

2. The robotic unscrambler of claim 1 wherein each guide comprises:
   (i) a guide support surface along which each said guide is supported during transport thereof through said operating region;
   (ii) an opposed article support surface along which said picker disposes an article when the guide is in an initial article placement position, said article support surface having a surface contour; and
   (iii) a top extent and an opposed bottom extent with which said guide support surface and said article support surface are coextensive.

3. The robotic unscrambler of claim 2 wherein said guide includes a retractable gate disposed adjacent said bottom extent of said guide for releasable engagement of an article when said guide moves from said initial article placement position.

4. The robotic unscrambler of claim 1 wherein the first direction of travel and the direction of travel of said second conveyance apparatus are oriented in the same direction.

5. The robotic unscrambler of claim 1 wherein the first direction of travel and the second direction of travel are oriented in one of: opposite directions and orthogonal directions.

6. The robotic unscrambler of claim 1 wherein said guide has a contoured article support surface with a generally concave curvature.

7. The robotic unscrambler of claim 1, further comprising a modular frame having at least one frame segment, said modular frame defining at least one picking region through which said first conveyance apparatus passes said at least one picker.

8. The robotic unscrambler of claim 1 wherein said uprighting device comprises an orientation device that includes an entrance portion leading to a channel portion and terminating in an exit portion; wherein said entrance portion supports an uprighting mechanism as said second conveyance apparatus conveys said guides along a travel path so as to move each said guide from an initial article placement position, in which each said article support surface facilitates placement of an article thereon, to a subsequent article conveyance position; wherein each said article support surface approaches an opposed article supporting mechanism to form an article retention region thereby; said channel portion retaining said guides in said article conveyance position along a channel path as said second conveyance apparatus transports said series of guides; said exit portion engaging said uprighting mechanism therealong as said second conveyance apparatus transports said series of guides along said travel path so as to facilitate return of each said guide toward said initial article placement position.

9. The robotic unscrambler of claim 8 wherein said orientation device comprises at least one guide rail forming said travel path for said guides.

10. The robotic unscrambler of claim 9 wherein said uprighting mechanism includes a guidepost protruding therefrom for engagement with said at least one guide rail.

11. The robotic unscrambler of claim 10 wherein at least a portion of said at least one guide rail includes a travel recess defined along at least a portion thereof for engagement with said uprighting mechanism.

12. The robotic unscrambler of claim 9 wherein said at least one guide rail comprises at least one of said entrance portion and said exit portion, wherein said at least one of said entrance portion and said exit portion is a generally curved member; wherein each said entrance portion supports said uprighting mechanism as said second conveyance apparatus conveys said series of guides along said travel path so as to move each said guide from said initial article placement position, in which each said article support surface facilitates placement of an article thereon, to a subsequent article conveyance position; wherein each said article support surface approaches an opposed article support surface to form an article retention region thereby; said channel portion retaining said guides in said article conveyance position along a channel path as said second conveyance apparatus transports said series of guides; said exit portions engaging said uprighting mechanism therealong as said second conveyance apparatus transports said series of guides along said travel path so as to facilitate return of each said guide toward said initial article placement position; wherein said article conveyance position places each said article in said conveyable orientation for further treatment at said one or more treatment stations in said production line.

13. The robotic unscrambler of claim 1 wherein at least one of said first conveyance apparatus and said second conveyance apparatus is selected from a group consisting of: one or more running transporter belts, one or more vacuum-conveyers, one or more guide rails, one or more pucks, and one or more pucks disposed on moving belts.

14. The robotic unscrambler of claim 13 wherein said second conveyance means comprises one or more pucks disposed along a moving belt for receiving said articles.

15. The robotic unscrambler of claim 13 wherein said second conveyance apparatus comprises at least one transporter belt to which at least one guide is pivotably connected.

16. The robotic unscrambler of claim 15, further comprising one of the following: a rail opposing said guides and located so that said guides upright said articles against said rail; or a belt opposing said guides and located so that said guides upright said articles against said belt.

17. The robotic unscrambler of claim 15 wherein a pair of transporter belts is provided having a movable outfeed conveyor disposed therebetween, wherein at least one said transporter belt includes a series of guides pivotably connected thereto.

18. The robotic unscrambler of claim 17 wherein said articles have a symmetrical configuration, and said picker transposes said articles from an initial orientation to substantially consecutive guides disposed on one side of said outfeed conveyor.

19. The robotic unscrambler of claim 17 wherein said articles have an asymmetrical configuration, and said picker transposes articles from an initial orientation to opposed alternating guides disposed on each side of said outfeed conveyor.

20. The robotic unscrambler of claim 1 wherein said picker is selected from a group of robots consisting of: parallel kinematics robots, Delta robots, six-axis robots, SCARA robots, and independently actuatable automatic arms.

21. The robotic unscrambler of claim 1, further comprising at least one camera in operative communication with said picker, wherein said at least one camera acquires information regarding at least one of: a location, a configuration, an orientation, and an article count for each of said articles along said first conveyance apparatus and transmits said information to said picker.

22. The robotic unscrambler of claim 1 wherein said information from said camera is transmitted to a programmable controller in operable communication with said at least one picker.

23. The robotic unscrambler of claim 1 wherein said uprighting device comprises an orientation device, and said orientation device is selected from the group consisting of: at least one guide rail, at least one airlift mechanism, at least one electromagnetic mechanism, and at least one servo mechanism.

24. A method of rearranging a plurality of randomly arranged articles in a stable conveyable orientation, said method comprising the steps of:
   a) providing a first conveyance apparatus and at least one picker, said first conveyance apparatus traveling in a first direction of travel such that said first conveyance apparatus transports said articles within an operating region of said at least one picker;
   b) providing an uprighting device for uprighting said articles, said uprighting device being positioned adjacent to said first conveyance apparatus, said uprighting device comprising a plurality of guides pivotably disposed along a second conveyance apparatus traveling in a direction of travel, wherein said guides are pivotable upward and transversely to the direction of travel of the second conveyance apparatus;
   c) removing an article from said first conveyance apparatus and placing said article onto one of said guides using said at least one picker; and
   d) uprighting said article in said uprighting device by pivoting said guide upward transversely to the direction of travel of the second conveyance apparatus.

* * * * *